(12) United States Patent
Takase

(10) Patent No.: US 9,086,512 B2
(45) Date of Patent: Jul. 21, 2015

(54) LIGHTING DEVICE AND DISPLAY DEVICE INCLUDING LIGHT SOURCE AND LIGHT-GUIDING PLATE WITH REFLECTIVE PLATE HAVING A BENT PORTION SURROUNDING THE LIGHT SOURCE

(75) Inventor: Kenji Takase, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 156 days.

(21) Appl. No.: 13/881,418

(22) PCT Filed: Oct. 21, 2011

(86) PCT No.: PCT/JP2011/074275
§ 371 (c)(1),
(2), (4) Date: Apr. 25, 2013

(87) PCT Pub. No.: WO2012/057017
PCT Pub. Date: May 3, 2012

(65) Prior Publication Data
US 2013/0229827 A1 Sep. 5, 2013

(30) Foreign Application Priority Data
Oct. 28, 2010 (JP) ................................ 2010-242114

(51) Int. Cl.
*F21V 8/00* (2006.01)
(52) U.S. Cl.
CPC ............ *G02B 6/0031* (2013.01); *G02B 6/0073* (2013.01); *G02B 6/0021* (2013.01); *G02B 6/0055* (2013.01)
(58) Field of Classification Search
CPC .. G02B 6/0031; G02B 6/0068; G02B 6/0055; G02B 6/0073

USPC .......................... 362/608–609, 613, 632–634
See application file for complete search history.

(56) References Cited

U.S. PATENT DOCUMENTS 7,645,063 B2 * 1/2010 Lee et al. ...................... 362/561
7,690,831 B2 * 4/2010 Mori et al. .................... 362/621
(Continued)

FOREIGN PATENT DOCUMENTS

JP 2001-184924 A 7/2001
JP 2006-310221 A 11/2006
(Continued)

OTHER PUBLICATIONS

Official Communication issued in International Patent Application No. PCT/JP2011/074275, mailed on Jan. 24, 2012.

*Primary Examiner* — Robert May
(74) *Attorney, Agent, or Firm* — Keating & Bennett, LLP

(57) ABSTRACT

A lighting device includes: light-emitting diodes (light sources) (4); an LED substrate (light source substrate) (5) that has a mounting surface (5*a*) on which the light-emitting diodes (4) are mounted; a light-guiding plate (6) that has a light incident surface (6*b*1) from which light from the light-emitting diodes (4) enters, and a light emitting surface (6*c*) that emits the light having entered from the light incident surface (6*b*1) toward a liquid crystal panel (object to be irradiated) (2); and a reflection plate (7) that is provided on a side of an opposite surface (6*d*) of the light-guiding plate (6) that is opposite to the light emitting surface (6*c*), and reflects light. The reflection plate (7) includes a bent portion (7*b*) formed by bending an end portion of the reflection plate (7) so that the bent portion surrounds the light-emitting diodes (4) while being in close contact with the mounting surface (5*a*) of the LED substrate (5).

7 Claims, 14 Drawing Sheets

(56) References Cited

U.S. PATENT DOCUMENTS

| | | | |
|---|---|---|---|
| 8,292,489 B2 * | 10/2012 | Chiu et al. | 362/634 |
| 8,322,903 B2 * | 12/2012 | Jao et al. | 362/607 |
| 2009/0262554 A1 * | 10/2009 | Lee et al. | 362/633 |
| 2011/0085107 A1 * | 4/2011 | Noh et al. | 349/61 |

FOREIGN PATENT DOCUMENTS

| | | |
|---|---|---|
| JP | 2007-250458 A | 9/2007 |
| JP | 2008-171797 A | 7/2008 |
| JP | 2009-026614 A | 2/2009 |

* cited by examiner

LIGHTING DEVICE AND DISPLAY DEVICE INCLUDING LIGHT SOURCE AND LIGHT-GUIDING PLATE WITH REFLECTIVE PLATE HAVING A BENT PORTION SURROUNDING THE LIGHT SOURCE

TECHNICAL FIELD

The present invention relates to a lighting device, in particular relates to a lighting device provided with a light source and a light-guiding plate that outputs light of the light source toward an object to be irradiated such as a liquid crystal panel, and a display device using the same.

BACKGROUND ART

Recently, for example, a liquid crystal display device has been used widely in a liquid crystal television, a monitor, a mobile telephone and the like, as a flat panel display having advantages such as thinness and light-weight in comparison with conventional Braun tubes. Such a liquid crystal display device includes a lighting device (backlight) that emits light and a liquid crystal panel that displays a desired image by playing a role as a shutter with respect to light from a light source provided in the lighting device.

The lighting device is classified roughly into a direct type and an edge-light type depending on the arrangement of the light source with respect to the liquid crystal panel as an object to be irradiated with light. For example, a liquid crystal display device for use in mobile equipment such as a mobile phone, a notebook PC, and a PDA generally adopts the edge-light type, which achieves a smaller thickness more easily than the direct type. More specifically, the edge-light type lighting device includes the light source on a side of the liquid crystal panel for achieving a smaller thickness, and uses a light-guiding plate that has a light emitting surface arranged opposite to a non-display surface of the liquid crystal panel so as to irradiate the liquid crystal panel with light from the light source.

Further, in the conventional lighting device, as described in JP 2007-250458 A below, for example, an opening is formed in a light-guiding plate and a light-emitting diode as a light source is inserted in the opening. Further, it is proposed in this conventional lighting device that, in upper and lower surfaces of the insertion portion of the light-emitting diode of the light-guiding plate, an inclined surface is formed so that the thickness of the light-guiding plate becomes smaller toward an LED substrate (light source substrate) side on which the light-emitting diode is mounted. Further, this conventional lighting device facilitates total reflection of light from the light-emitting diode in the light-guiding plate, thereby enhancing light use efficiency of the light-emitting diode.

PRIOR ART DOCUMENT

Patent Document

Patent Document 1: JP 2007-250458 A

DISCLOSURE OF INVENTION

Problem to be Solved by the Invention

However, in the conventional lighting device as described above, each of the inclined surfaces in the upper and lower surfaces of the light-guiding plate is in contact with air. Because of this, in this conventional lighting device, the light use efficiency of the light-emitting diode (light source) sometimes cannot be enhanced depending on materials and a refractive index of the light-guiding plate or an inclined angle of the inclined surface. That is, in the conventional lighting device, in an interface between the inclined surface and air, light not exceeding a critical angle passes through the light-guiding plate without being totally reflected at the interface and leaks outside. Consequently, in the conventional lighting device, light from the light-emitting diode cannot enter the light-guiding plate efficiently, and hence the light use efficiency of the light-emitting diode cannot be enhanced.

In view of the above-described problem, it is an object of the present invention to provide a lighting device with excellent light use efficiency that can cause light from a light source to enter a light-guiding plate efficiently, and a display device using the same.

Means for Solving Problem

In order to achieve the above-described object, a lighting device according to the present invention includes: a light source; a light source substrate that has a mounting surface on which the light source is mounted; a light-guiding plate that has a light incident surface from which light from the light source enters, and a light emitting surface that emits the light having entered from the light incident surface toward an object to be irradiated; and a reflection plate that is provided on a side of an opposite surface of the light-guiding plate that is opposite to the light emitting surface, and reflects light. The reflection plate includes a bent portion formed by bending an end portion of the reflection plate so that the bent portion surrounds the light source while being in close contact with the mounting surface of the light source substrate.

In the lighting device configured as above, the reflection plate is provided on the opposite surface side of the light-guiding plate. Further, the reflection plate includes a bent portion formed by bending an end portion of the reflection plate so that the bent portion surrounds the light source while being in close contact with the mounting surface of the light source substrate. Thereby, unlike the above-described conventional example, the light from the light source can enter the light-guiding plate efficiently regardless of materials of the light-guiding plate or the like, and thus a lighting device with excellent light use efficiency can be configured.

Further, in the lighting device described above, it is preferable that the reflection plate includes a principal surface that is opposite to the opposite surface of the light-guiding plate, and the bent portion includes: a lower surface that is formed continuously to the principal surface and located below the light source; a back surface that is formed continuously to the lower surface and in close contact with the mounting surface of the light source substrate on the back surface side of the light source; and an upper surface that is formed continuously to the back surface and located above the light source.

In this case, the lower surface, the back surface and the upper surface of the bent portion can cause the light from the light source to enter the light-guiding plate reliably, thereby enhancing the light use efficiency reliably.

Further, in the lighting device described above, it is preferable that the back surface is fixed to the mounting surface of the light source substrate using an adhesive.

In this case, the creation of a gap between the back surface and the mounting surface can be prevented reliably, whereby leakage of light from the gap can be prevented reliably and the light use efficiency can be enhanced more reliably.

Further, in the lighting device described above, in the reflection plate, a specular reflection portion may be provided at least on a surface of the bent portion.

In this case, the specular reflection portion can cause the light from the light source to enter the light-guiding plate more efficiently.

Further, in the lighting device described above, it is preferable that in the reflection plate, a reflection portion is provided in such a manner as to cover a non-light incident surface of the light-guiding plate to which the light source is not arranged opposite, so as to reflect light from the inside of the light-guiding plate toward the light-guiding plate side.

In this case, the reflection portion can cause the light having leaked from the non-light incident surface to the outside of the light-guiding plate to reenter the inside of the light-guiding plate, thereby enhancing the light use efficiency of the light source further.

Further, in the lighting device described above, a light-emitting diode may be used as the light source.

In this case, a lighting device with low power consumption and environmental friendliness can be configured easily.

Further, a display device of the present invention includes any one of the above lighting devices.

Since the display device configured as above includes the lighting device with excellent light use efficiency that can cause the light from the light source to enter the light-guiding plate efficiently, a display device with high brightness and low power consumption can be configured easily.

Further, in the display device described above, a liquid crystal panel may be used as the object to be irradiated.

In this case, a liquid crystal display device with high brightness and low power consumption can be configured easily.

Effect of the Invention

According to the present invention, it is possible to provide a lighting device with excellent light use efficiency that can cause light from a light source to enter a light-guiding plate efficiently, and a display device using the same.

DESCRIPTION OF THE INVENTION

Hereinafter, preferred embodiments of a lighting device of the present invention and a liquid crystal display device using the same will be described with reference to the drawings. In the following description, the present invention is applied to a transmission-type liquid crystal display device. Further, the dimensions of constituent members in the respective drawings do not faithfully reflect the actual dimensions of constituent members, dimension ratio of the respective constituent members, etc.

[Embodiment 1]

Figure 1:
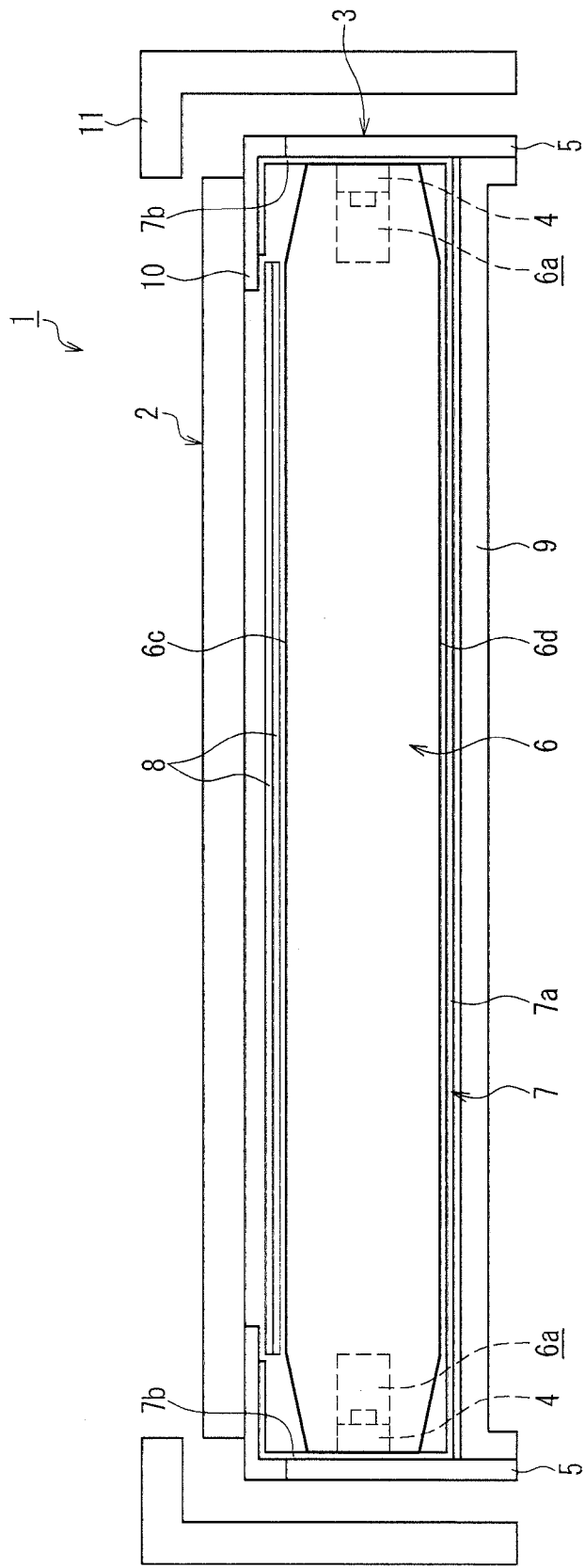
FIG. 1 is a view illustrating a lighting device according to Embodiment 1 of the present invention and a liquid crystal display device.

FIG. 1 is a view illustrating a lighting device according to Embodiment 1 of the present invention and a liquid crystal display device. In FIG. 1, a liquid crystal display device 1 of the present embodiment is provided with a liquid crystal panel 2 that is located with an upper side of FIG. 1 defined as a viewing side (the display surface side) and a lighting device 3 of the present invention that is arranged on a non-display surface side of the liquid crystal panel 2 (the lower side in FIG. 1) and generates illumination light for illuminating the liquid crystal panel 2. Further, in the liquid crystal display device 1, the liquid crystal panel 2 and the lighting device 3 are assembled and integrated into a transmission-type liquid crystal display device 1 where illumination light from the lighting device 3 enters the liquid crystal panel 2.

The liquid crystal panel 2 includes a liquid crystal layer, and an active matrix substrate and a color filter substrate as a pair of substrates sandwiching the liquid crystal layer (not shown). The active matrix substrate includes pixel electrodes, thin film transistors (TFT) and the like (not shown) that are formed between the active matrix substrate and the liquid crystal layer in accordance with a plurality of pixels included in the display surface of the liquid crystal panel 2. Meanwhile, the color filter substrate includes color filters, counter electrodes and the like that are formed between the color filter substrate and the liquid crystal layer (not shown).

Further, the liquid crystal panel 2 is provided with a control device (not shown) that performs drive control of the liquid crystal panel 2. The display surface is driven on a pixel basis by operating the liquid crystal layer on a pixel basis, whereby a desired image is displayed on the display surface.

Note that the liquid crystal panel 2 can have any liquid crystal mode and any pixel structure. The liquid crystal panel 2 also can have any drive mode. In other words, any liquid crystal panel capable of displaying information can be used as the liquid crystal panel 2. Therefore, a detailed structure of the liquid crystal panel 2 is not illustrated in FIG. 1, and the explanation will be omitted.

Next, the liquid crystal panel 2 of the present embodiment will be described specifically also with reference to FIG. 2.

Figure 2:
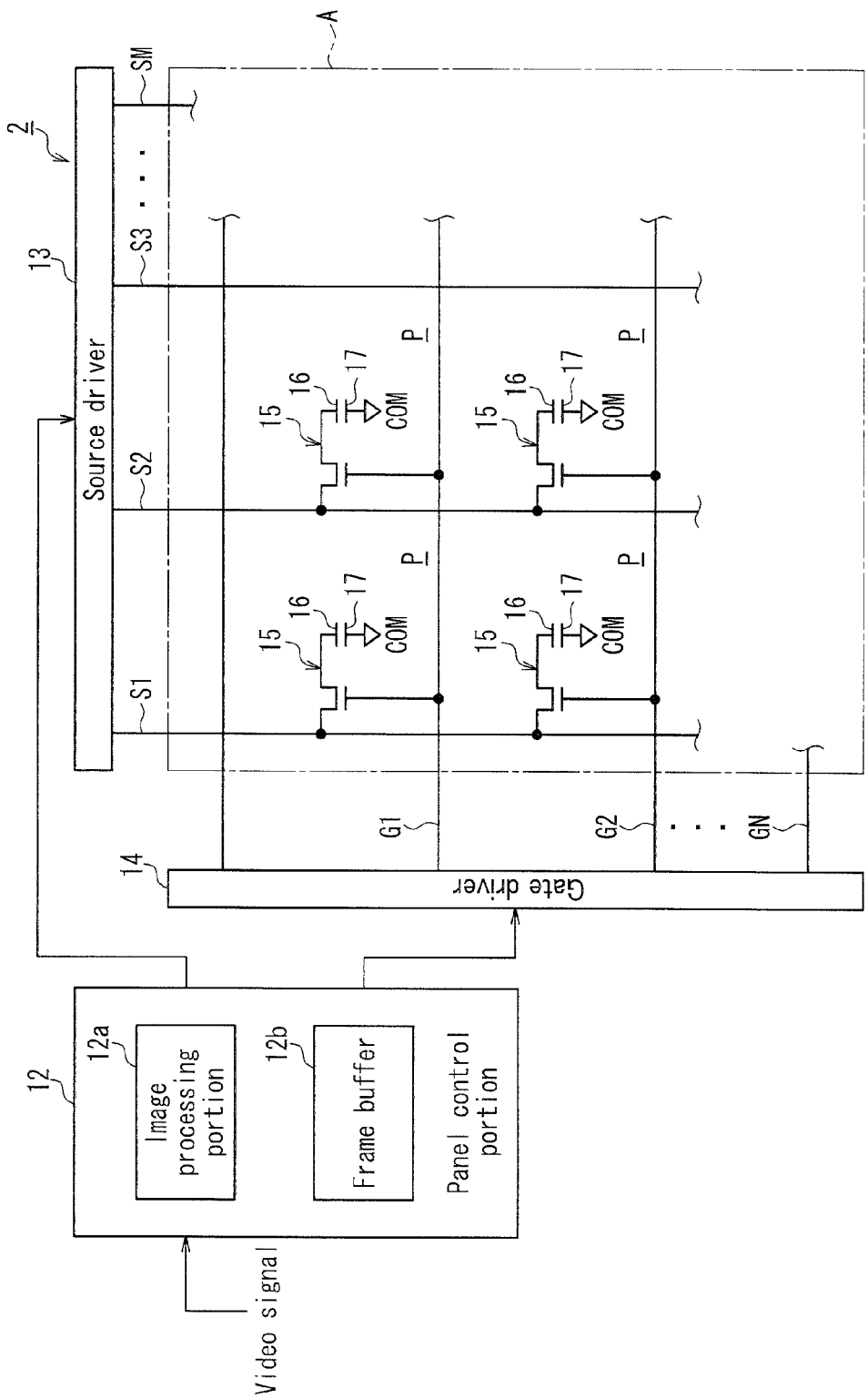
FIG. 2 is a diagram illustrating a configuration of a liquid crystal panel shown in FIG. 1.

FIG. 2 is a diagram illustrating a configuration of the liquid crystal panel shown in FIG. 1.

In FIG. 2, the liquid crystal display device 1 (FIG. 1) is provided with a panel control portion 12 that performs drive control of the liquid crystal panel 2 (FIG. 1) as the display portion that displays information such as characters and images, and a source driver 13 and a gate driver 14 that are operated based on instruction signals from the panel control portion 12.

The panel control portion 12 is provided in the control device and receives a video signal from outside of the liquid crystal display device 1. Further, the panel control portion 12 includes an image processing portion 12a that performs predetermined image processing on input video signals so as to generate respective instruction signals to the source driver 13 and the gate driver 14, and a frame buffer 12b that can store one frame of display data contained in the input video signals. The panel control portion 12 performs drive control of the source driver 13 and drive control of the gate driver 14 in accordance with input video signals, whereby information in accordance with the video signals is displayed on the liquid crystal panel 2.

The source driver 13 and the gate driver 14 are placed on the active matrix substrate, for example. Specifically, on the surface of the active matrix substrate, the source driver 13 is placed along the horizontal direction of the liquid crystal panel 2 in an outside region of an effective display area A of the liquid crystal panel 2 as a display panel. Further, on the surface of the active matrix substrate, the gate driver 14 is placed along the vertical direction of the liquid crystal panel 2 in the outside region of the effective display area A.

Further, the source driver 13 and the gate driver 14 are drive circuits that drive, on a pixel basis, a plurality of pixels P provided on the liquid crystal panel 2 side. The source driver 13 and the gate driver 14 respectively are connected to a plurality of source lines S1-SM (M is an integer of 2 or more, hereinafter referred to as "S" collectively) and a plurality of gate lines G1-GN (N is an integer of 2 or more, hereinafter referred to as "G" collectively). The source lines S and the gate lines G constitute data lines and scanning lines, respectively, and are arrayed in a matrix so as to cross each other on a base material (not shown) made of a transparent glass material or a transparent synthetic resin contained in the active matrix substrate. Specifically, the source lines S are provided on the base material so as to be parallel to a column direction of the matrix (the vertical direction of the liquid crystal panel 2) and the gate lines G are provided on the base material so as to be parallel to a row direction of the matrix (the horizontal direction of the liquid crystal panel 2).

Further, the pixels P are provided in the vicinity of each intersection between the source line S and the gate line G. Each of the pixels P includes the thin film transistor 15 as a switching element and a pixel electrode 16 connected to the thin film transistor 15. Each of the pixels P also includes a common electrode 17 located opposite to the pixel electrode 16, with the liquid crystal layer of the liquid crystal panel 2 being interposed therebetween. In other words, in the active matrix substrate, the thin film transistor 15, the pixel electrode 16 and the common electrode 17 are provided on a pixel basis.

Moreover, in the active matrix substrate, the plurality of pixels P are formed in areas that are partitioned in a matrix by the source lines S and the gate lines G. The plurality of pixels P include red (R), green (G) and blue (B) pixels. The RGB pixels are sequentially arranged, for example, in this order in parallel to the gate lines G1-GN. Further, the RGB pixels can display corresponding colors by color filter layers (not shown) provided on the color filter substrate side.

Further, in the active matrix substrate, based on instruction signals from the image processing portion 12a, the gate driver 14 sequentially outputs scanning signals (gate signals) with respect to the gate lines G1-GN so as to bring gate electrodes of the corresponding thin film transistors 15 into an ON state. Further, based on instruction signals from the image processing portion 12a, the source driver 13 outputs data signals (voltage signals (gradation voltage)) in accordance with brightness (gradation) of the display image with respect to the corresponding source lines S1-SM.

Returning to FIG. 1, the lighting device 3 includes light-emitting diodes 4 as light sources, an LED substrate 5 as a light source substrate on which the light-emitting diodes 4 are mounted, and a light-guiding plate 6 that guides light from the light-emitting diodes 4 to a predetermined propagation direction (lateral direction of FIG. 1) and outputs the light to the liquid crystal panel (object to be irradiated) 2 side. For example, the light-guiding plate 6 is made of a synthetic resin such as a transparent acrylic resin (e.g., polymethyl methacrylate resin (PMMA)). In the light-guiding plate 6, each of two opposing side portions includes an inclined portion whose thickness becomes smaller toward the LED substrate 5 side. The specific thickness of the light-guiding plate 6 is 1 mm to 4 mm, for example.

Further, in the light-guiding plate 6, holes 6a are formed in each of the two side portions. The light-emitting diodes 4 are inserted in the holes 6a. In the light-guiding plate 6, light from the light-emitting diodes 4 enters from a light incident surface (described later). The light-guiding plate 6 also includes a light emitting surface 6c that emits the light from the light-emitting diodes 4 having entered from the light incident surface toward the liquid crystal panel 2, and an opposite surface 6d that is opposite to the light emitting surface 6c.

In the lighting device 3, a reflection plate 7 is provided so as to cover the opposite surface 6d of the light-guiding plate 6 and each of the two side portions of the light-guiding plate 6. The reflection plate 7 is made of polyethylene terephthalate (PET) and the like, for example. Further, for example, the reflection plate 7 has a reflectance of 90% to 99% and a thickness of 100 um to 1000 um. Moreover, the reflection plate 7 includes a principal surface 7a that is opposite to the opposite surface 6d of the light-guiding plate 6, and a bent portion 7b that surrounds each of the side portions of the light-guiding plate 6. Thereby, the light use efficiency of the light-emitting diodes 4 can be enhanced reliably (detailed later).

Further, in the lighting device 3, optical sheets 8 such as a lens sheet and a diffusion sheet are provided on the liquid crystal panel 2 side of the light-guiding plate 6. The optical sheets 8 convert the light from the light-emitting diodes 4 having been guided inside the light-guiding plate 6 in the propagation direction into planar illumination light having a uniform brightness, and supply the planar illumination light to the liquid crystal panel 2. Further, a chassis 9 is provided in the lighting device 3. When the chassis 9 is assembled with the LED substrate 5, it serves as a container that contains respective portions of the lighting device 3.

Further, in the liquid crystal display device 1, a P (plastic) chassis 10 having an L-shaped cross section is provided on the LED substrate 5. The liquid crystal panel 2 is mounted on the P chassis 10. In the liquid crystal display device 1, the liquid crystal panel 2 and the lighting device 3 are assembled integrally inside a bezel 11 having an L-shaped cross section.

Here, a configuration of main portions of the lighting device 3 of the present embodiment will be described specifically also with reference to FIGS. 3 to 7.

Figure 3:
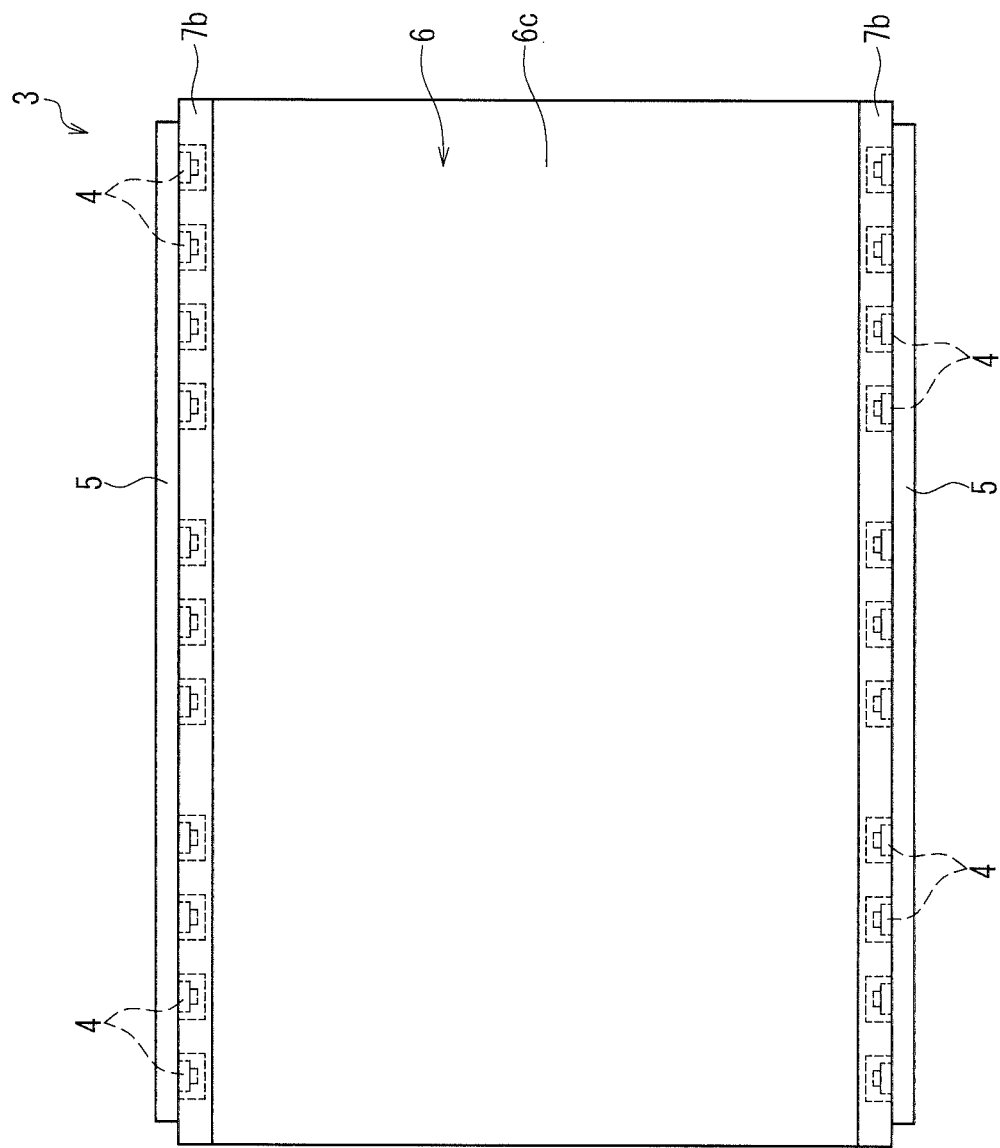
FIG. 3 is a plan view illustrating a configuration of main portions of the lighting device.
Figure 4:
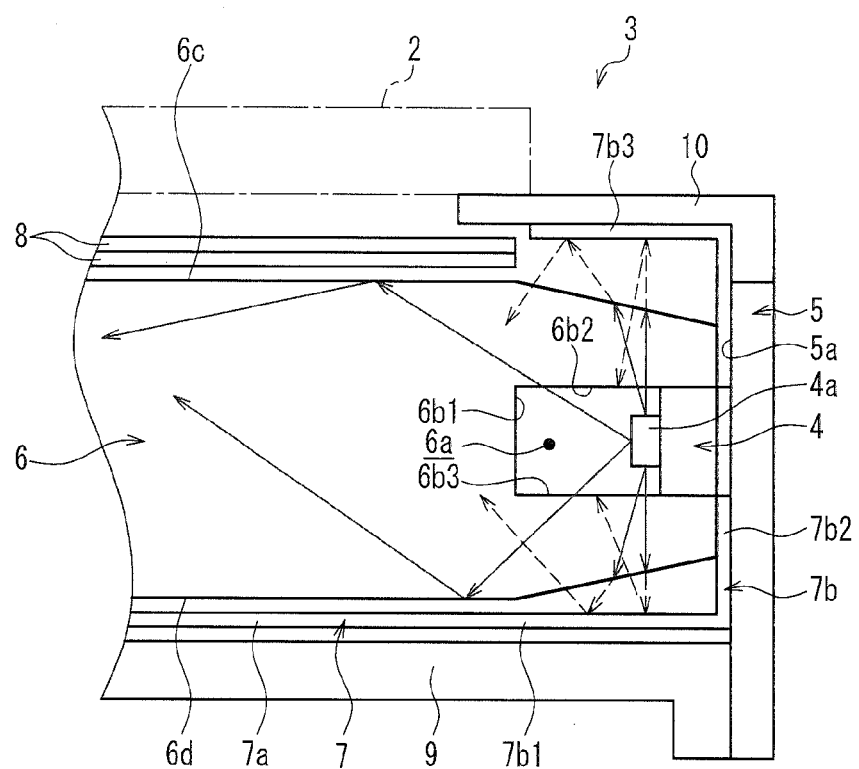
FIG. 4 is a partial enlarged view illustrating a configuration of main portions of the lighting device.
Figure 5:
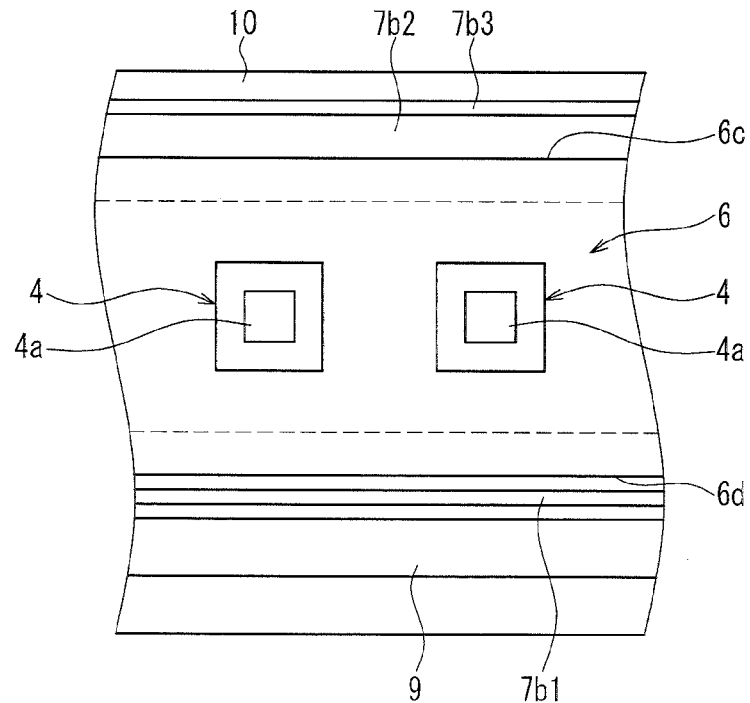
FIG. 5 is a front view of a light-emitting diode shown in FIG. 4.
Figure 6:
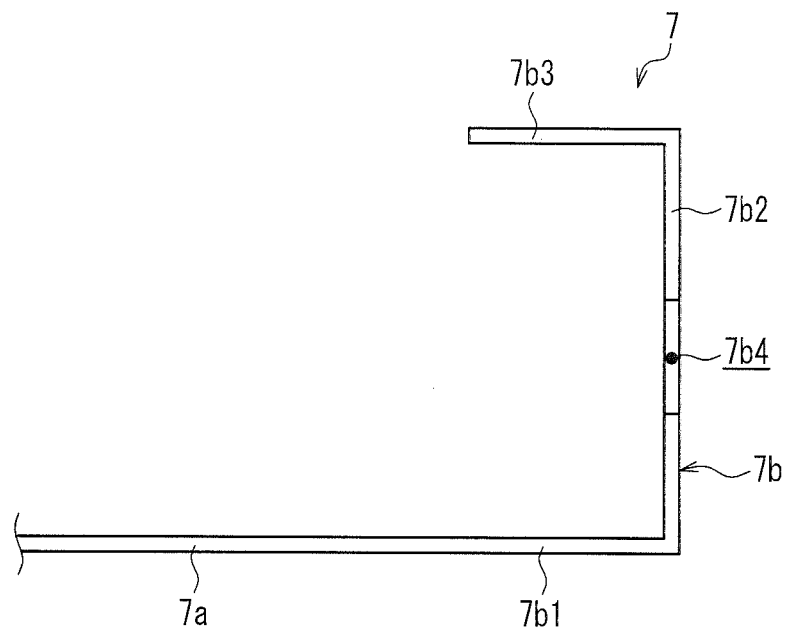
FIG. 6 is a side view showing a configuration of main portions of a reflection plate shown in FIG. 4.
Figure 7:
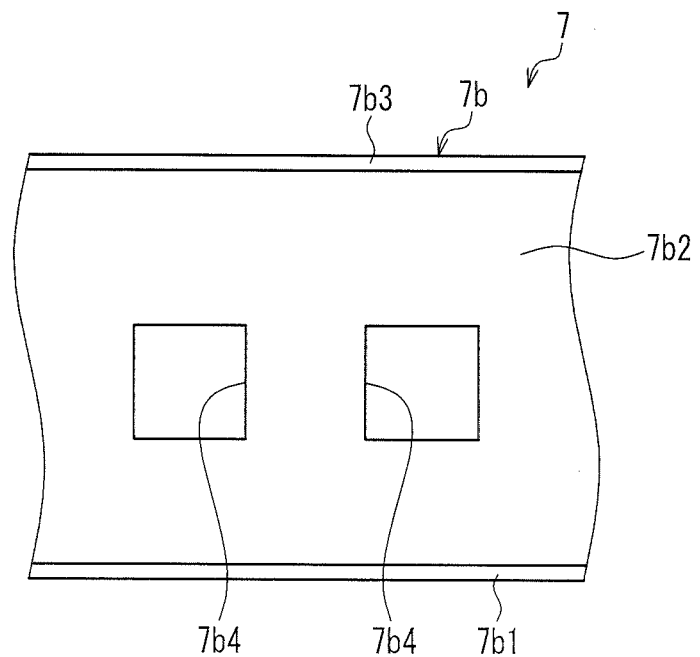
FIG. 7 is a front view of the reflection plate seen from the light-guiding plate side shown in FIG. 4.

FIG. 3 is a plan view illustrating a configuration of main portions of the lighting device. FIG. 4 is a partial enlarged view illustrating a configuration of main portions of the lighting device. FIG. 5 is a front view of a light-emitting diode shown in FIG. 4. FIG. 6 is a side view showing a configuration of main portions of a reflection plate shown in FIG. 4. FIG. 7 is a front view of the reflection plate seen from the light-guiding plate side shown in FIG. 4.

As shown in FIG. 3, a plurality of light-emitting diodes 4, e.g., eleven light-emitting diodes 4 are attached to the LED substrate 5. Further, as shown in the same FIG. 3, in the light-guiding plate 6, the hole 6a (FIG. 1) is formed per the light-emitting diode 4, for example.

In FIGS. 4 and 5, for example, the light-emitting diodes 4 are a top view type (top emission type) that emits white light, and has a light emitter 4a. The light-emitting diodes 4 are mounted on a mounting surface 5a of the LED substrate 5. Further, the light-emitting diodes 4 are inserted in the holes 6a of the light-guiding plate 6 so that light enters light incident surfaces 6b1, 6b2, 6b3 of the light-guiding plate 6 that surround the holes 6a.

As shown in FIGS. 4 to 7, the reflection plate 7 includes the principal surface 7a and the bent portion 7b formed by bending an end portion of the reflection plate 7. The bent portion 7b surrounds the light-emitting diodes 4.

Specifically, the bent portion 7b has a lower surface 7b1 that is formed continuously to the principal surface 7a and located below the light-emitting diodes 4, a back surface 7b2 that is formed continuously to the lower surface 7b1 and in close contact with the mounting surface 5a of the LED substrate 5 on the back surface side of the light-emitting diodes 4, and an upper surface 7b3 that is formed continuously to the back surface 7b2 and located above the light-emitting diodes 4. In other words, as exemplified in FIG. 6, in the bent portion 7b, the back surface 7b2 is orthogonal to the lower surface 7b1 and the upper surface 7b3 is orthogonal to the back surface 7b2, for example.

The back surface 7b2 is fixed to the mounting surface 5a of the LED substrate 5 using an adhesive. Further, as shown in FIGS. 6 and 7, through holes 7b4 for inserting the light-emitting diodes 4 are formed in the back surface 7b2. In the bent portion 7b, as exemplarily indicated by a dotted arrow in FIG. 4, the lower surface 7b1 and the upper surface 7b3 reflect light having leaked from the inside of the light-guiding plate 6 back to the inside of the light-guiding plate 6.

In the lighting device 3 of the present embodiment configured as above, the reflection plate 7 is provided on the opposite surface 6d side of the light-guiding plate 6. Further, the reflection plate 7 includes the bent portion 7b formed by bending an end portion of the reflection plate 7 so that the bent portion 7b surrounds the light-emitting diodes (light sources) 4 while being in close contact with the mounting surface 5a of the LED substrate (light source substrate) 5. Thereby, unlike the conventional example described above, in the present embodiment, the light from the light-emitting diodes 4 can enter the light-guiding plate 6 efficiently regardless of materials of the light-guiding plate 6 or the like, and thus the lighting device 3 with excellent light use efficiency can be configured.

Further, in the present embodiment, the lighting device 3 with excellent light use efficiency of the light-emitting diodes 4 can be configured, thereby reducing the number of light-emitting diodes 4 to be placed and reducing the cost of the lighting device 3 easily.

Further, in the present embodiment, the reflection plate 7 includes the principal surface 7a that is opposite to the opposite surface 6d of the light-guiding plate 6. Further, the bent portion a1 has the lower surface 7b1 that is formed continuously to the principal surface 7a and located below the light-emitting diodes 4, the back surface 7b2 that is formed continuously to the lower surface 7b1 and in close contact with the mounting surface 5a of the LED substrate 5 on the back surface side of the light-emitting diodes 4, and the upper surface 7b3 that is formed continuously to the back surface 7b2 and located above the light-emitting diodes 4. Thus, in the present embodiment, the lower surface 7b1, the back surface 7b2 and the upper surface 7b3 of the bent portion 7b can cause the light from the light-emitting diodes 4 to enter the light-guiding plate 6 reliably, thereby enhancing the light use efficiency reliably.

Further, in the present embodiment, the back surface 7b2 is fixed to the mounting surface 5a of the LED substrate 5 using an adhesive. Thereby, in the present embodiment, the creation of a gap between the back surface 7b2 and the mounting surface 5a can be prevented reliably, and hence leakage of light from the gap can be prevented reliably and the light use efficiency can be enhanced more reliably.

Further, heat from the light-emitting diodes 4 can be dissipated via the LED substrate 5, the reflection plate 7, the chassis 9 and the P chassis 10. Thereby, emission characteristics of the light-emitting diodes 4 can be stabilized.

Further, since the present embodiment uses the lighting device 3 with excellent light use efficiency that can cause the light from the light-emitting diodes 4 to enter the light-guiding plate 6 efficiently, the liquid crystal display device 1 with high brightness and low power consumption can be configured easily.

[Embodiment 2]

Figure 8:
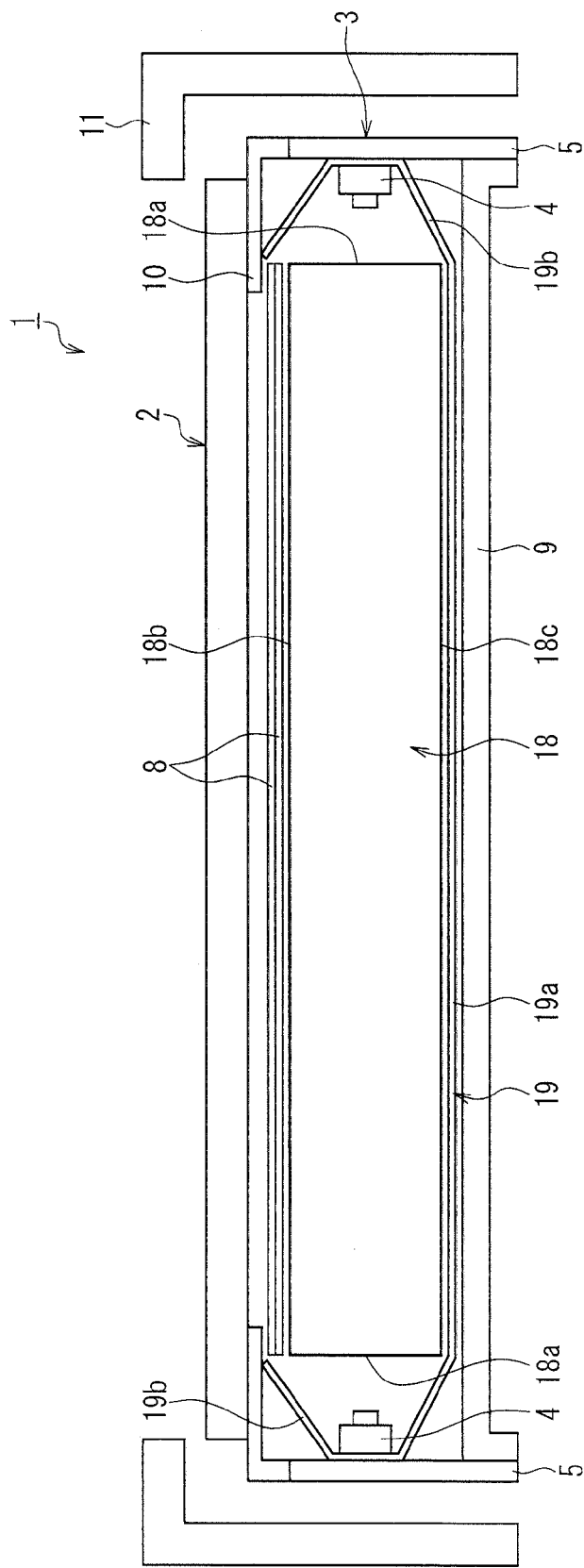
FIG. 8 is a view illustrating a lighting device according to Embodiment 2 of the present invention and a liquid crystal display device.
Figure 9:
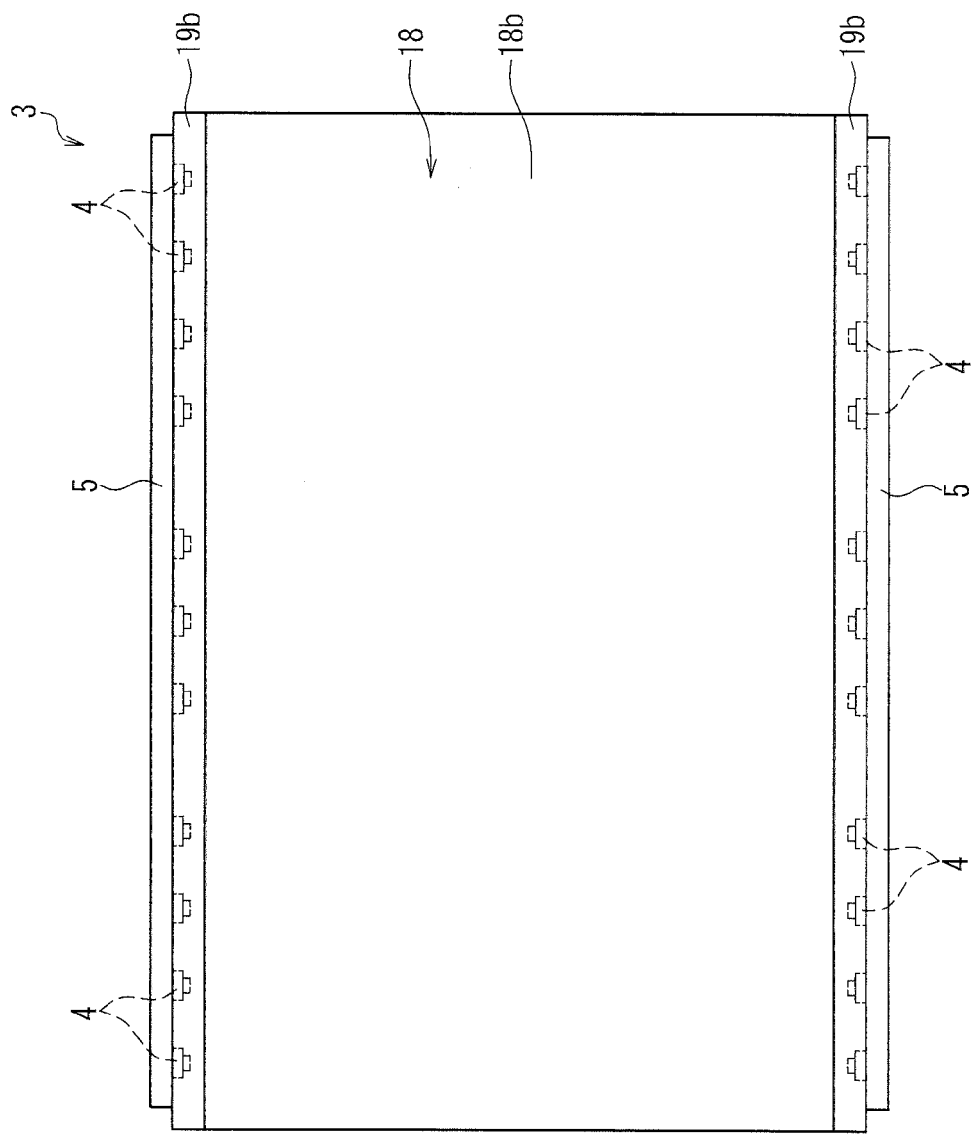
FIG. 9 is a plan view illustrating a configuration of main portions of the lighting device shown in FIG. 8.
Figure 10:
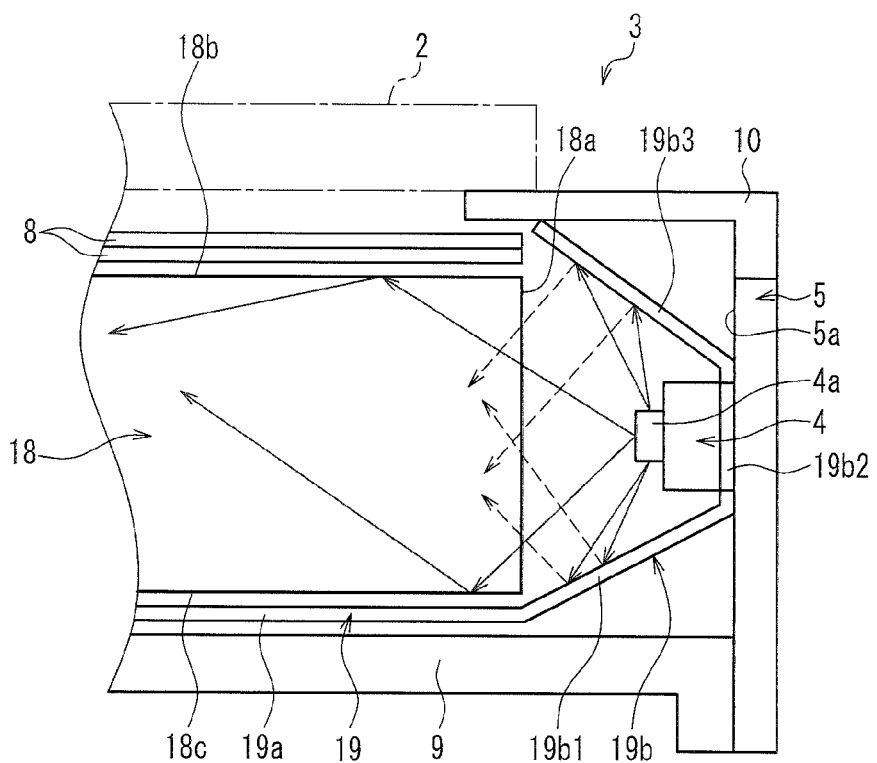
FIG. 10 is a partial enlarged view illustrating a configuration of main portions of the lighting device shown in FIG. 8.
Figure 11:
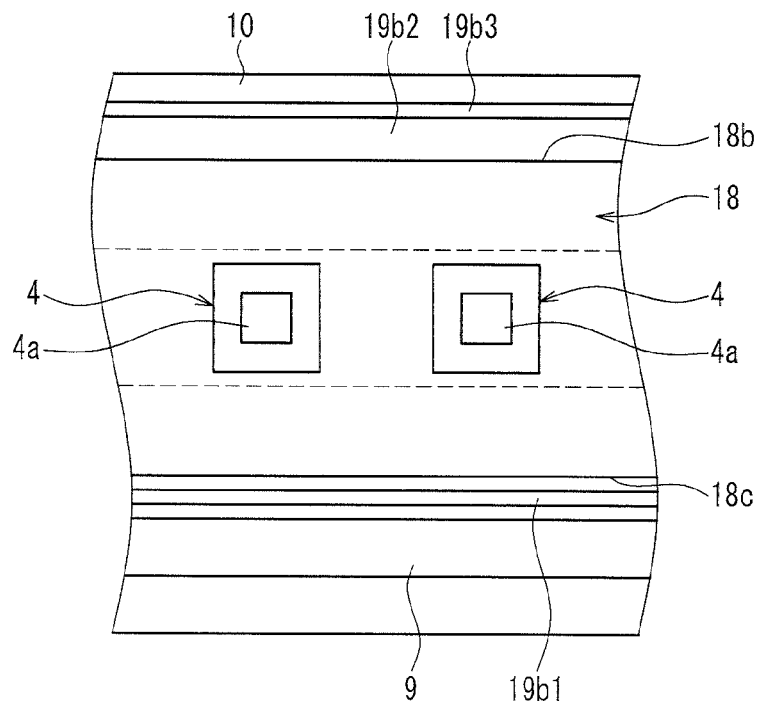
FIG. 11 is a front view of a light-emitting diode shown in FIG. 10.
Figure 12:
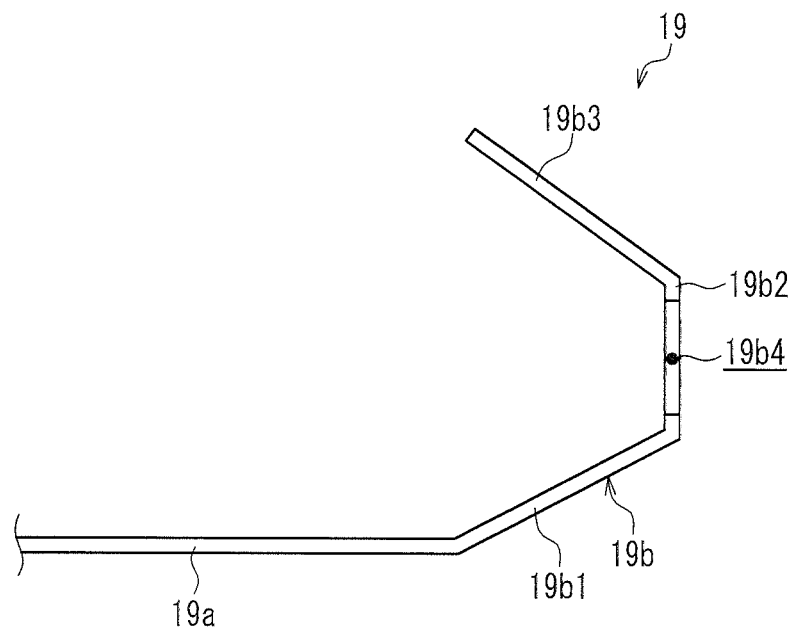
FIG. 12 is a side view showing a configuration of main portions of a reflection plate shown in FIG. 10.
Figure 13:
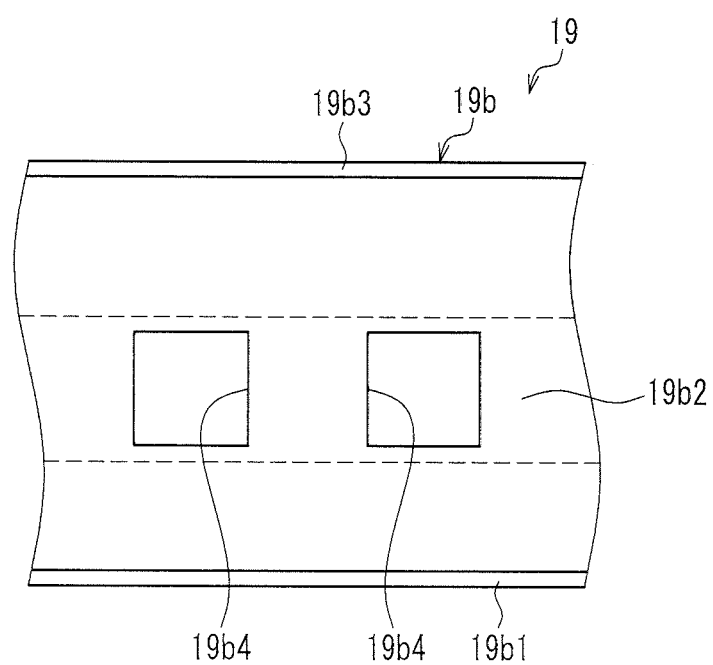
FIG. 13 is a front view of the reflection plate seen from the light-guiding plate side shown in FIG. 10.

FIG. 8 is a view illustrating a lighting device according to Embodiment 2 of the present invention and a liquid crystal display device. FIG. 9 is a plan view illustrating a configuration of main portions of the lighting device shown in FIG. 8. FIG. 10 is a partial enlarged view illustrating a configuration of main portions of the lighting device shown in FIG. 8. FIG. 11 is a front view of a light-emitting diode shown in FIG. 10. FIG. 12 is a side view showing a configuration of main portions of a reflection plate shown in FIG. 10. FIG. 13 is a front view of the reflection plate seen from the light-guiding plate side shown in FIG. 10.

In the drawings, the present embodiment mainly differs from the above-described Embodiment 1 in that light-emitting diodes are arranged opposite to the light incident surface of the light-guiding plate without forming holes in the light-guiding plate. The common elements as those in the above-described Embodiment 1 are denoted with the same reference numerals, and the explanation will not be repeated.

As shown in FIG. 8, a light-guiding plate 18 having a rectangular-shaped cross section is used in the lighting device 3 of the present embodiment. The light-guiding plate 18 includes a light incident surface 18a that is opposite to the light-emitting diodes (light sources) 4 and receives light from the light-emitting diodes 4, a light emitting surface 18b that emits the light having entered from the light incident surface

18*a* toward the liquid crystal panel (object to be irradiated) 2, and an opposite surface 18*c* that is opposite to the light emitting surface 18*b*.

As shown in FIGS. 9 to 13, a reflection plate 19 includes a principal surface 19*a* that is opposite to the opposite surface 18*c* of the light-guiding plate 18, and a bent portion 19*b* formed by bending an end portion of the reflection plate 19. The bent portion 19*b* surrounds the light-emitting diodes 4.

Specifically, the bent portion 19*b* has a lower surface 19*b*1 that is formed continuously to the principal surface 19*a* and located below the light-emitting diodes 4, a back surface 19*b*2 that is formed continuously to the lower surface 19*b*1 and in close contact with the mounting surface 5*a* of the LED substrate 5 on the back surface side of the light-emitting diodes 4, and an upper surface 19*b*3 that is formed continuously to the back surface 19*b*2 and located above the light-emitting diodes 4. In other words, as exemplified in FIG. 12, in the bent portion 19*b*, the back surface 19*b*2 is inclined at a predetermined angle relative to the lower surface 19*b*1 and the upper surface 19*b*3 is included at a predetermined angle relative to the back surface 19*b*2, for example.

The back surface 19*b*2 is fixed to the mounting surface 5*a* of the LED substrate 5 using an adhesive. Further, as shown in FIGS. 12 and 13, through holes 19*b*4 for inserting the light-emitting diodes 4 are formed in the back surface 19*b*2. In the bent portion 19*b*, as exemplarily indicated by a dotted arrow in FIG. 10, the lower surface 19*b*1 and the upper surface 19*b*3 reflect light having leaked from the inside of the light-guiding plate 18 back to the inside of the light-guiding plate 18.

With the configuration described above, the present embodiment can provide the same effects as those in the above-described Embodiment 1. Further, since the present embodiment uses the light-guiding plate 18 having a rectangular-shaped cross section, the production cost of the light-guiding plate 18 can be reduced as compared with the light-guiding plate 6 of Embodiment 1 that includes the inclined portions and the holes 6*a* in each of the two side portions. Thus, the lighting device 3 can be configured at low cost.

[Embodiment 3]

Figure 14:
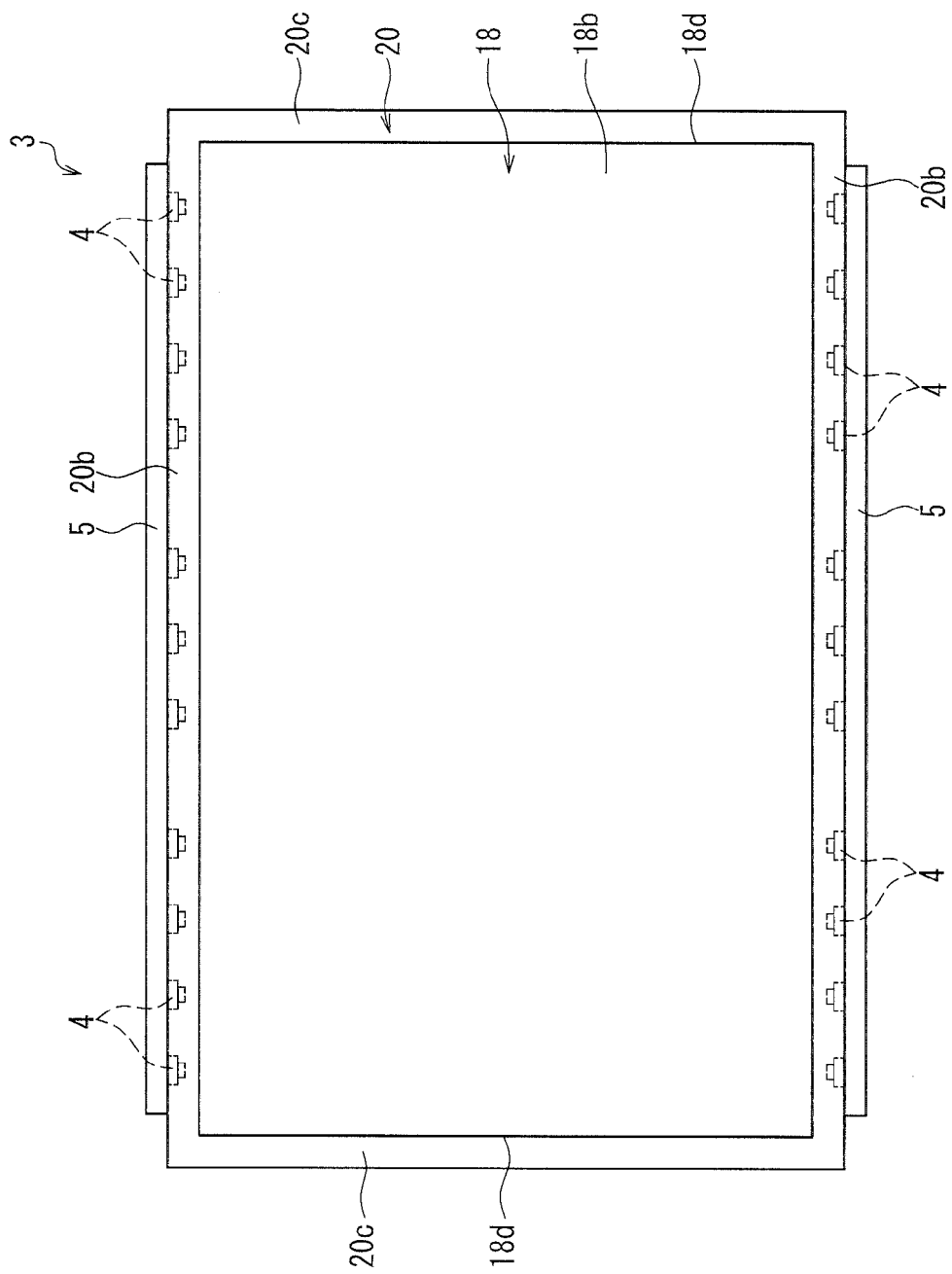
FIG. 14 is a plan view illustrating a configuration of main portions of a lighting device according to Embodiment 3 of the present invention.
Figure 15:
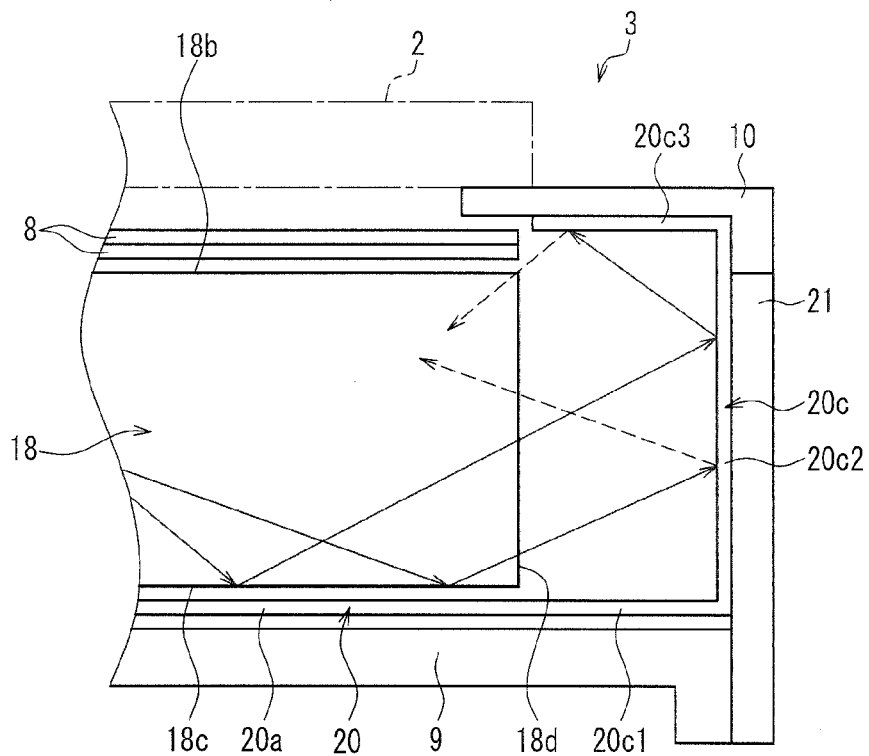
FIG. 15 is a partial enlarged view illustrating a configuration of main portions of the lighting device shown in FIG. 14.
Figure 16:
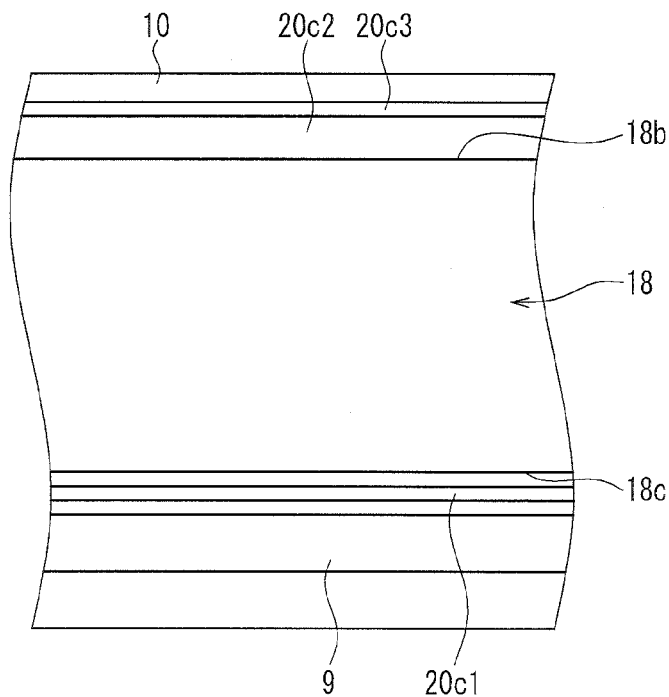
FIG. 16 is a front view of a configuration of main portions of the lighting device seen from the inside of a light-guiding plate shown in FIG. 15.
Figure 17:
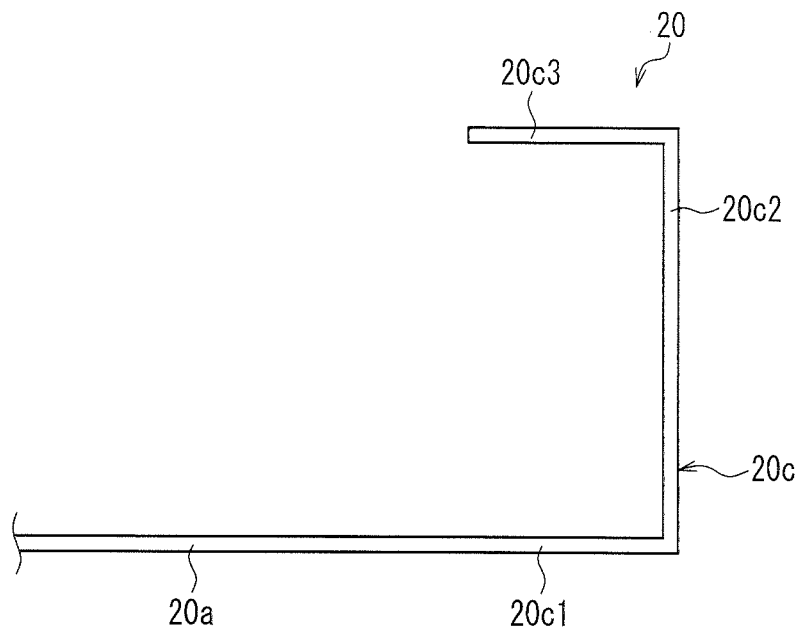
FIG. 17 is a side view showing a configuration of main portions of a reflection plate shown in FIG. 15.
Figure 18:
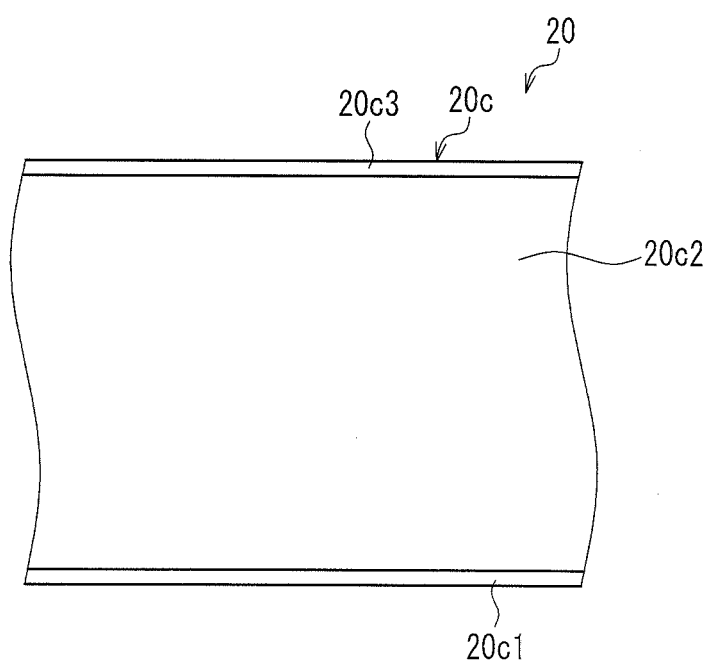
FIG. 18 is a front view of the reflection plate seen from the light-guiding plate side shown in FIG. 15.

FIG. 14 is a plan view illustrating a configuration of main portions of a lighting device according to Embodiment 3 of the present invention. FIG. 15 is a partial enlarged view illustrating a configuration of main portions of the lighting device shown in FIG. 14. FIG. 16 is a front view of a configuration of main portions of the lighting device seen from the inside of a light-guiding plate shown in FIG. 15. FIG. 17 is a side view showing a configuration of main portions of a reflection plate shown in FIG. 15. FIG. 18 is a front view of the reflection plate seen from the light-guiding plate side shown in FIG. 15.

In the drawings, the present embodiment mainly differs from the above-described Embodiment 2 in that a reflection portion is provided in the reflection plate in such a manner as to cover a non-light incident surface of the light-guiding plate. The common elements as those in the above-described Embodiment 2 are denoted with the same reference numerals, and the explanation will not be repeated.

As shown in FIG. 14, similarly to Embodiment 2, in a reflection plate 20 of the present embodiment, a bent portion 20*b* is provided on the light-emitting diode 4 side. Further, in the reflection plate 20, a reflection portion 20*c* is provided on a non-light incident surface 18*d* side that is not opposite to the light-emitting diodes 4 of the light-guiding plate 18.

Specifically, also with reference to FIGS. 15 to 18, the reflection plate 20 includes a principal surface 20*a* that is opposite to the opposite surface 18*c* of the light-guiding plate 18, and the reflection portion 20*c* that is formed by bending an end portion of the reflection plate 20. The reflection portion 20*c* is provided in such a manner as to cover the non-light incident surface 18*d* of the light-guiding plate 18, so as to reflect light from the inside of the light-guiding plate 18 toward the light-guiding plate 18 side.

More specifically, the reflection portion 20*c* has a lower surface 20*c*1 that is formed continuously to the principal surface 20*a* and located on the chassis 9 side, a back surface 20*c*2 that is formed continuously to the lower surface 20*c*1 and in close contact with a side body 21 to be assembled with the chassis 9 and the P chassis 10, and an upper surface 20*c*3 that is formed continuously to the back surface 20*c*2 and located on the P chassis 10 side. In other words, as exemplified in FIG. 17, in the reflection portion 20*c*, the back surface 20*c*2 is orthogonal to the lower surface 20*c*1 and the upper surface 20*c*3 is orthogonal to the back surface 20*c*2, for example.

The back surface 20*c*2 is fixed to the side body 21 using an adhesive. Further, in the reflection portion 20*c*, as exemplarily indicated by a dotted arrow in FIG. 15, the back surface 20*c*2 and the upper surface 20*c*3 reflect light having leaked from the inside of the light-guiding plate 18 back to the inside of the light-guiding plate 18.

With the configuration described above, the present embodiment can provide the same effects as those in the above-described Embodiment 2. Further, in the present embodiment, in the reflection plate 20, the reflection portion 20*c* is provided in such a manner as to cover the non-light incident surface 18*d* of the light-guiding plate 18 to which the light-emitting diodes (light sources) 4 are not arranged opposite, so as to reflect light from the inside of the light-guiding plate 18 toward the light-guiding plate 18 side. Thus, in the present embodiment, the reflection portion 20*c* can cause the light having leaked from the non-light incident surface 18*d* to the outside of the light-guiding plate 18 to reenter the inside of the light-guiding plate 18, thereby enhancing the light use efficiency of the light-emitting diodes 4 further.

[Embodiment 4]

Figure 19:
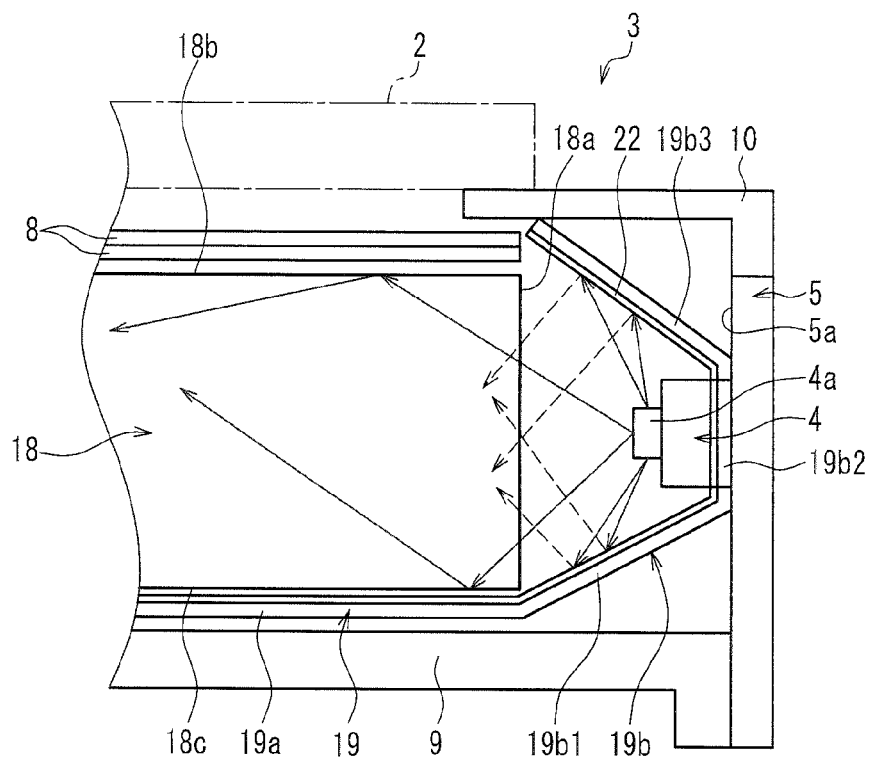
FIG. 19 is a partial enlarged view illustrating a configuration of main portions of a lighting device according to Embodiment 4 of the present invention.
Figure 20:
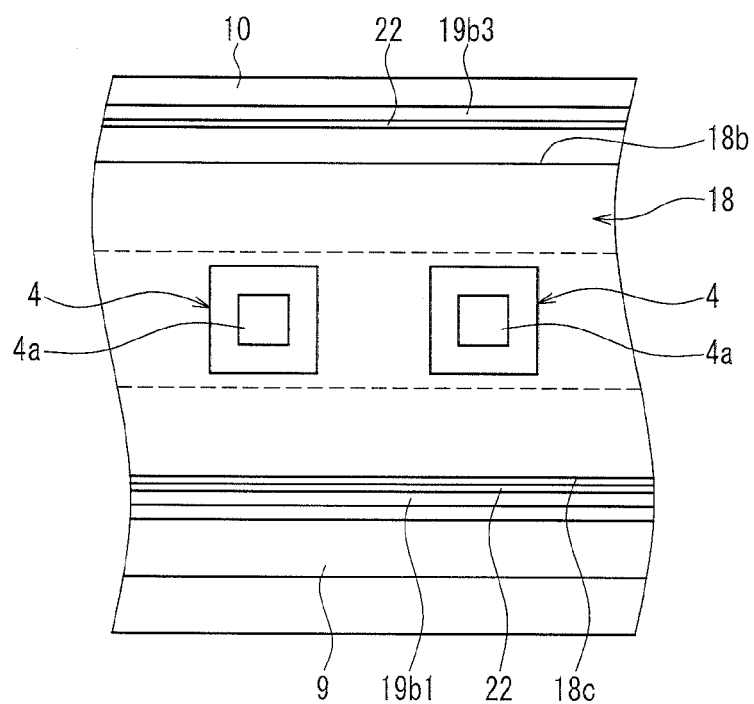
FIG. 20 is a front view of a light-emitting diode shown in FIG. 19.
Figure 21:
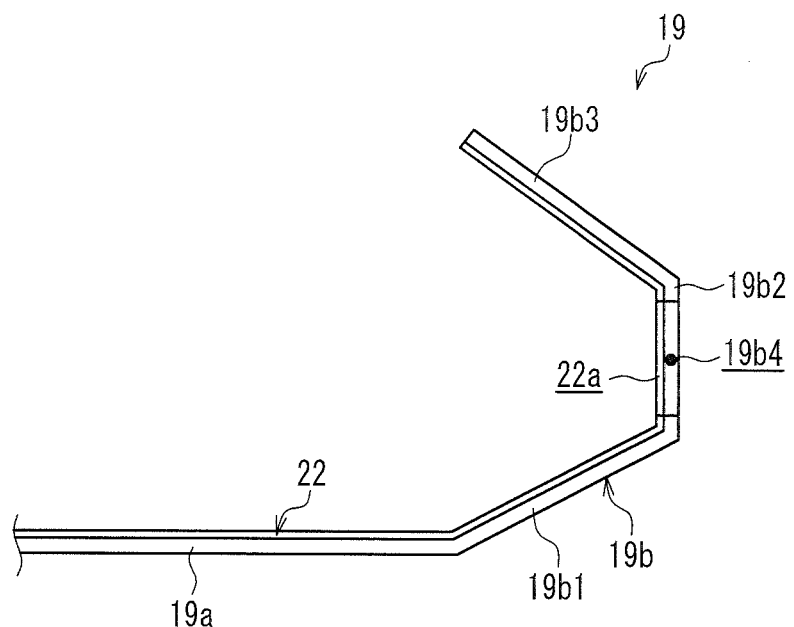
FIG. 21 is a side view showing a configuration of main portions of a reflection plate shown in FIG. 19.
Figure 22:
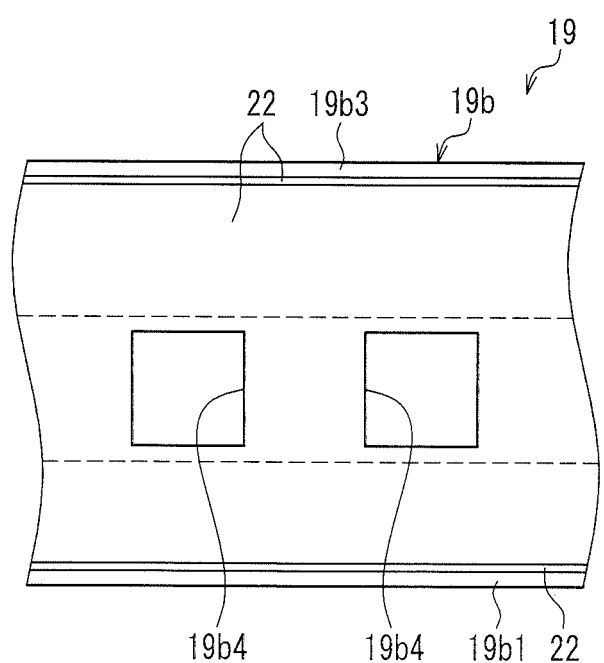
FIG. 22 is a front view of the reflection plate seen from the light-guiding plate side shown in FIG. 19.

FIG. 19 is a partial enlarged view illustrating a configuration of main portions of a lighting device according to Embodiment 4 of the present invention. FIG. 20 is a front view of a light-emitting diode shown in FIG. 19. FIG. 21 is a side view showing a configuration of main portions of a reflection plate shown in FIG. 19. FIG. 22 is a front view of the reflection plate seen from the light-guiding plate side shown in FIG. 19.

In the drawings, the present embodiment mainly differs from above-described Embodiment 2 in that a specular reflection portion is provided on the surface of the reflection plate. The common elements as those in the above-described Embodiment 2 are denoted with the same reference numerals, and the explanation will not be repeated.

Specifically, as shown in FIGS. 19 to 22, in the lighting device 3 of the present invention, a specular reflection portion 22 is provided on the surface of the reflection plate 19. The specular reflection portion 22 is made of a metallic film having an excellent light reflectance such as silver. Further, as indicated by a dotted arrow in FIG. 19, the specular reflection portion 22 specularly reflects light having leaked from the inside of the light-guiding plate 18 back to the inside of the light-guiding plate 18.

With the configuration described above, the present embodiment can provide the same effects as those in the above-described Embodiment 2. Further, in the present embodiment, the specular reflection portion 22 is provided on the surface of the reflection plate 19, thereby causing the light from the light-emitting diodes (light sources) 4 to enter the light-guiding plate 18 more efficiently.

In addition to the above description, the specular reflection portion 22 may be provided only on the surface of the bent portion 19b.

The above embodiments are shown merely for an illustrative purpose and are not limiting. The technical range of the present invention is defined by the claims, and all the changes within a range equivalent to the configuration recited in the claims also are included in the technical range of the present invention.

For example, in the above description, the present invention is applied to a transmission-type liquid crystal display device. However, the lighting device of the present invention is not limited to this, and it can be applied also to various display devices such as a semi-transmission type liquid crystal display device or a projection-type display device that uses a liquid crystal panel for its light bulb.

Further, in addition to the above description, the lighting device of the present invention can be used suitably as a film viewer that irradiates light to a radiograph, a light box for irradiating light to a picture negative or the like to make it easy to recognize the negative visually, and a light-emitting device that lights up a signboard, an advertisement set on a wall surface in a station, or the like.

Further, in the above description, the light-emitting diode is used as the light source. However, the light source of the present invention is not limited to this, and may be a discharge tube such as a cold cathode fluorescent tube and a hot cathode fluorescent tube.

Incidentally, as in the respective Embodiments above, to use the light-emitting diode as the light source is preferable in that a low-power-consumption lighting device with can be configured easily. Further, since the light-emitting diode does not contain mercury, it is preferable also in that an environmentally-friendly lighting device can be configured easily.

Further, in the above description, light of the light source enters from each of the two opposing side portions of the light-guiding plate. However, the present invention is not limited to this as long as light of the light source can enter from at least one of the side portions of the light-guiding plate.

INDUSTRIAL APPLICABILITY

The present invention is useful with respect to a lighting device with excellent light use efficiency that can cause light from a light source to enter a light-guiding plate efficiently, and a display device using the same.

DESCRIPTION OF REFERENCE NUMERALS 1 liquid crystal display device
2 liquid crystal panel (object to be irradiated)
3 lighting device
4 light-emitting diode (light source)
5 LED substrate (light source substrate)
5a mounting surface
6, 18 light-guiding plate
6b1, 6b2, 6b3, 18a light incident surface
6c, 18b light emitting surface
6d, 18c opposite surface
18d non-light incident surface
7, 19, 20 reflection plate
7a, 19a, 20a principal surface
7b, 19b, 20b bent portion
7b1, 19b1 lower surface
7b2, 19b2 back surface
7b3, 19b3 upper surface
20c reflection portion
22 specular reflection portion

The invention claimed is:

1. A lighting device comprising:
a light source;
a light source substrate that has a mounting surface on which the light source is mounted;
a light-guiding plate that has a light incident surface from which light from the light source enters, and a light emitting surface that emits the light having entered from the light incident surface toward an object to be irradiated; and
a reflection plate that is provided on a side of an opposite surface of the light-guiding plate that is opposite to the light emitting surface, and reflects light, wherein
the reflection plate includes a bent portion formed by bending an end portion of the reflection plate so that the bent portion surrounds the light source while being in close contact with the mounting surface of the light source substrate;
the reflection plate includes a principal surface that is opposite to the opposite surface of the light-guiding plate;
the bent portion includes:
a lower surface that is formed continuously to the principal surface and located below the light source;
a back surface that is formed continuously to the lower surface and in close contact with the mounting surface of the light source substrate on the back surface side of the light source; and
an upper surface that is formed continuously to the back surface and located above the light source; and
the back surface includes a through hole arranged to receive the light source, such that the back surface is arranged between the light source and the light source substrate.

2. The lighting device according to claim 1, wherein the back surface is fixed to the mounting surface of the light source substrate using an adhesive.

3. The lighting device according to claim 1, wherein in the reflection plate, a specular reflection portion is provided at least on a surface of the bent portion.

4. The lighting device according to claim 1, wherein in the reflection plate, a reflection portion is provided in such a manner as to cover a non-light incident surface of the light-guiding plate to which the light source is not arranged opposite, so as to reflect light from the inside of the light-guiding plate toward the light-guiding plate side.

5. The lighting device according to claim 1, wherein a light-emitting diode is used as the light source.

6. A display device comprising the lighting device according to claim 1.

7. The display device according to claim 6, wherein a liquid crystal panel is used as the object to be irradiated.

* * * * *